(12) United States Patent
Doi et al.

(10) Patent No.: US 7,348,962 B2
(45) Date of Patent: *Mar. 25, 2008

(54) INFORMATION INPUT APPARATUS, INFORMATION INPUT METHOD, AND RECORDING MEDIUM

(75) Inventors: Miwako Doi, Kawasaki (JP); Shunichi Numazaki, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 213 days.

This patent is subject to a terminal disclaimer.

(21) Appl. No.: 11/071,183

(22) Filed: Mar. 4, 2005

(65) Prior Publication Data

US 2005/0162385 A1     Jul. 28, 2005

Related U.S. Application Data (63) Continuation of application No. 09/268,656, filed on Mar. 16, 1999, now Pat. No. 6,900,790.

(30) Foreign Application Priority Data

Mar. 17, 1998 (JP) .................................. 10-066384

(51) Int. Cl.
*G09G 5/00* (2006.01)
*G06T 15/00* (2006.01)
*H04N 7/18* (2006.01)

(52) U.S. Cl. ...................... 345/156; 345/419; 715/863; 348/155

(58) Field of Classification Search ................. 345/156, 345/419; 715/863; 348/42, 51, 155
See application file for complete search history.

(56) References Cited

U.S. PATENT DOCUMENTS

| | | | |
|---|---|---|---|
| 4,690,549 A | 9/1987 | Nakada | |
| 4,963,985 A | 10/1990 | Isoguchi et al. | |
| 5,168,531 A | 12/1992 | Sigel | |
| 5,454,043 A | 9/1995 | Freeman | |
| 5,496,106 A | 3/1996 | Anderson | |
| 5,596,366 A | 1/1997 | Takashima et al. | |
| 5,617,312 A | 4/1997 | Irura et al. | |
| 5,710,597 A | 1/1998 | Tamaki et al. | |
| 5,825,413 A | 10/1998 | Mullis | |
| 5,826,008 A | 10/1998 | Bluvband | |
| 5,864,334 A | 1/1999 | Sellers | |

(Continued)

FOREIGN PATENT DOCUMENTS

JP     5-241690     9/1993

(Continued)

*Primary Examiner*—Richard Hjerpe
*Assistant Examiner*—Kevin M Nguyen
(74) *Attorney, Agent, or Firm*—Oblon, Spivak, McClelland, Maier & Neustadt, P.C.

(57) ABSTRACT

The operation characteristics of an image capture unit are changed on the basis of the captured image. If an object does not move, i.e., if the user does not input, the capture timing and the like are decreased to reduce the consumption power. The capturing condition is changed by, e.g., increasing a distance for capturing an image until an image can be captured, and even a plurality of users with different ways of use can use the apparatus without setting again the capturing conditions for the different ways of use.

18 Claims, 5 Drawing Sheets

U.S. PATENT DOCUMENTS

| | | |
|---|---|---|
| 5,963,255 A | 10/1999 | Anderson et al. |
| 5,996,079 A | 11/1999 | Klein |
| 6,002,808 A | 12/1999 | Freeman |
| 6,043,805 A | 3/2000 | Hsieh |
| 6,094,215 A | 7/2000 | Sundahl et al. |
| 6,115,482 A | 9/2000 | Sears et al. |
| 6,144,366 A | 11/2000 | Numazaki et al. |
| 6,233,016 B1 | 5/2001 | Anderson et al. |
| 6,900,790 B1 * | 5/2005 | Doi et al. .................. 345/156 |

FOREIGN PATENT DOCUMENTS

| | | |
|---|---|---|
| JP | 6-83527 | 3/1994 |
| JP | 9-91079 | 4/1997 |

* cited by examiner

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 255 | 0 | 0 | 0 | 0 | 0 |
| 0 | 0 | 250 | 0 | 0 | 0 | 0 | 0 |
| 0 | 0 | 250 | 0 | 0 | 0 | 0 | 0 |
| 0 | 220 | 250 | 0 | 220 | 0 | 0 | 0 |
| 0 | 220 | 220 | 0 | 220 | 0 | 0 | 0 |
| 0 | 220 | 220 | 200 | 200 | 0 | 0 | 0 |

INFORMATION INPUT APPARATUS, INFORMATION INPUT METHOD, AND RECORDING MEDIUM

This application is a continuation of co-pending U.S. patent application Ser. No. 09/268,656, filed Mar. 16, 1999, which is based on Japanese Patent Application No. 10-66384, filed Mar. 17, 1998, the contents of each of which are incorporated herein by reference.

BACKGROUND OF THE INVENTION

The present invention relates to an information input apparatus and method for inputting user's gestures, and a recording medium.

As an input device to a computer, a mouse is prevalently used. The mouse is used to attain roles of a two-dimensional pointing devices such as movement of the cursor, selection of a menu, and the like.

Actual operations follow a given rule. For example, a menu is selected by successively pressing a mouse button twice (double-clicking). That is, the actual operation is not an intuitive operation. For this reason, aged users cannot often double-click as it is a non-intuitive operation.

In order to solve such problem, studies for realizing an intuitive operation for, e.g., moving the cursor in the screen to the right by moving the hand to the right have been made. One of such studies is gesture recognition for recognizing, e.g., motions of the hand by image processing.

For example, a study for recognizing the hand shape by analyzing a moving image such as a video picture has been made. When the hand shape is extracted using colors, since the hand is skin color, only a skin color portion may be extracted. However, if beige cloths or wall is present as a background, it is hard to recognize skin color. Even when beige is distinguished from skin color by adjustment, if illumination has changed, the color tone also changes. Hence, it is difficult to steadily extract a skin color portion.

Alternatively, a method of calculating a motion vector between frames, and analyzing a moving object is available. In this case, no problem is posed when the number of moving objects is small. However, if the number of moving objects is large, the number of motion vectors increases abruptly, and the load upon calculating the motion vectors between frames becomes heavier. Hence, calculation cannot catch up analysis.

In this manner, in a conventional method of capturing and analyzing an image using an imaging means such as a video camera, since the analysis flow and information to be analyzed are fixed, when the image to be analyzed changes gradually according to an external condition, the load acts on a specific processor block, and analysis cannot be made in time.

As one method of solving such problem, a high-performance computer and high-speed transmission system are used to realize real-time processing (e.g., processing for 30 images per sec) even when the load becomes heavier. However, if the external condition does not change largely, the high-performance computer and high-speed transmission system cannot exhibit their performance, resulting in very poor cost performance.

In order to compensate for such problem, as disclosed in, e.g., U.S. Ser. No. 08/953,667, an information input apparatus, which is capable of information input by a gesture since it can easily extract an image from a background to extract a motion of the hand of the user by capturing light reflected by an object in synchronism with light emission means, has been developed.

Using such information input apparatus, e.g., in the home, the ON/OFF states and the like of a TV, audio equipment, lighting equipment, and the like can be remote-controlled. In order to allow input anytime the user desires, the information input apparatus must be kept ON. Unlike the mouse or the like, since the apparatus must actively emit light, electric power for emission is required.

As described above, in a conventional image processing method, it is hard to attain low-cost, robust analysis with respect to external conditions that vary constantly. In order to attain robust analysis even under varying external conditions, a high-performance computer and high-speed transmission system must be used, resulting in too high cost. Hence, such system cannot be used in homes.

BRIEF SUMMARY OF THE INVENTION

It is an object of the present invention to provide an information input apparatus which can reduce the consumption power by delaying the capture timing or the like when an object does not move, i.e., when the user does not input, by changing the operation characteristics of an image capture means on the basis of the captured image, an information input method, and recording medium.

It is another object of the present invention to provide an information input apparatus which can be used by a plurality of users with different ways of use without re-doing setups, by changing the capture condition, e.g., by increasing the capture distance, until an image can be captured, an information input method, and a recording medium.

In order to achieve the above object, according to the present invention, an information input apparatus comprises: an image capture unit for capturing an image of an object; a motion detection section for detecting a motion of the object in the image captured by the image capturing unit; and a changing section for changing an operation characteristic of the image capture unit when the motion detection section detects the motion of the object in the captured image.

Further, according to the present invention, an information input method comprising the steps of: capturing an image of an object; detecting a motion of the object in the image captured by the capturing step; and changing an operation characteristic of the capturing step when the motion detection step detects the motion of the object in the captured image.

Further, according to the present invention, an article of manufacture comprises: a computer usable medium having computer readable program code means embodied therein for causing an operation characteristic of capturing an image to be changed, the computer readable program code means in the article of manufacture comprises: computer readable program code means for causing a computer to capture an image of an object; computer readable program code means for causing a computer to detect a motion of the object in the captured image; and computer readable program code means for causing a computer to change an operation characteristic of the computer capturing an image of the object when the computer detects the motion of the object in the captured image.

Additional objects and advantages of the invention will be set forth in the description which follows, and in part will be obvious from the description, or may be learned by practice of the invention. The objects and advantages of the invention may be realized and obtained by section of the instrumentalities and combinations particularly pointed out in the appended claims.

According to the present invention, while the user does not use the information input apparatus, the consumption power is reduced. When the user approaches the information input apparatus to use it, the capture timing and the like are automatically set to follow user's gestures. Therefore, the consumption power can be easily reduced without requiring any load on the user.

Also, according to the present invention, since the capture characteristics are automatically changed until an image can be captured, even when a plurality of users share a single information input apparatus, they can make information inputs without manually changing the setup distance and the like. Hence, direct operation according to the user's intention can be realized without exerting any load on the user.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A and 2B may be collectively referred to herein as "FIG. 2";

DETAILED DESCRIPTION OF THE INVENTION

First Embodiment

Figure 1:
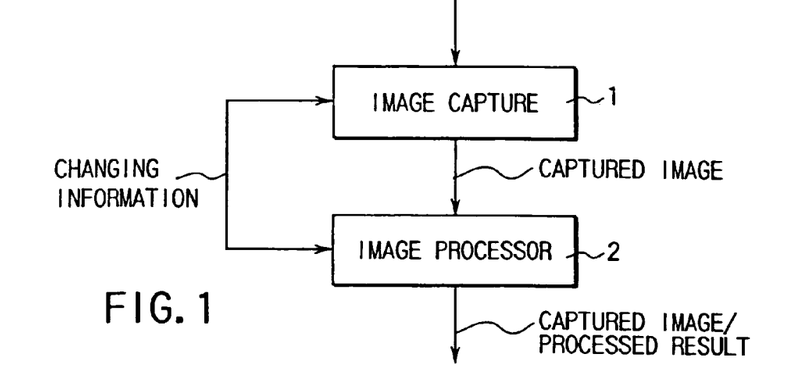
FIG. 1 is a schematic block diagram showing the arrangement according to the first embodiment of the present invention.

The operation of the first embodiment will be explained below with reference to the accompanying drawings. FIG. 1 is a schematic block diagram showing the arrangement of the first embodiment, and FIG. 2 is a schematic view of an image capture unit 1 in the arrangement shown in FIG. 1.

An apparatus of this embodiment is constructed by an image capture unit 1 which receives reflected light and captures a distant image, as described in, e.g., U.S. Ser. No. 08/953,667, and an image processor 2 which analyzes an image captured by the image capture unit 1 and extracts the barycenter, moving speed, and the like.

Figure 2A:
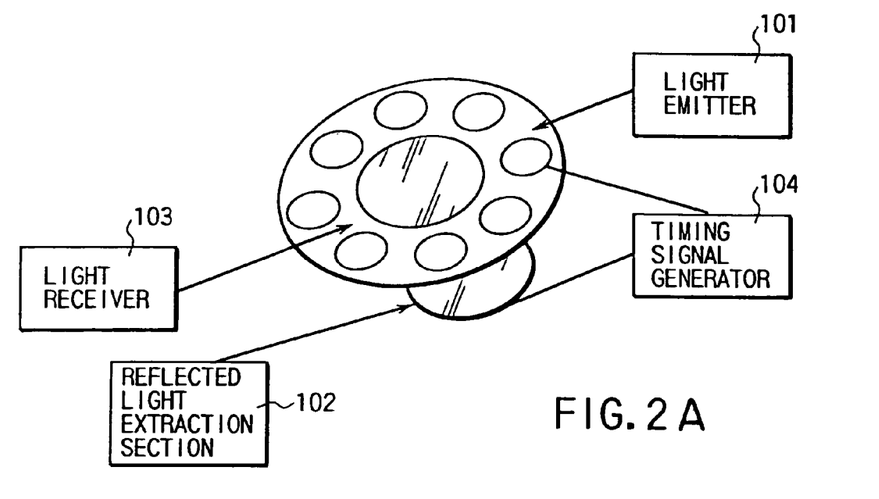
FIG. 2A is a schematic view of a distant image capture unit according to the present invention.
Figure 2B:
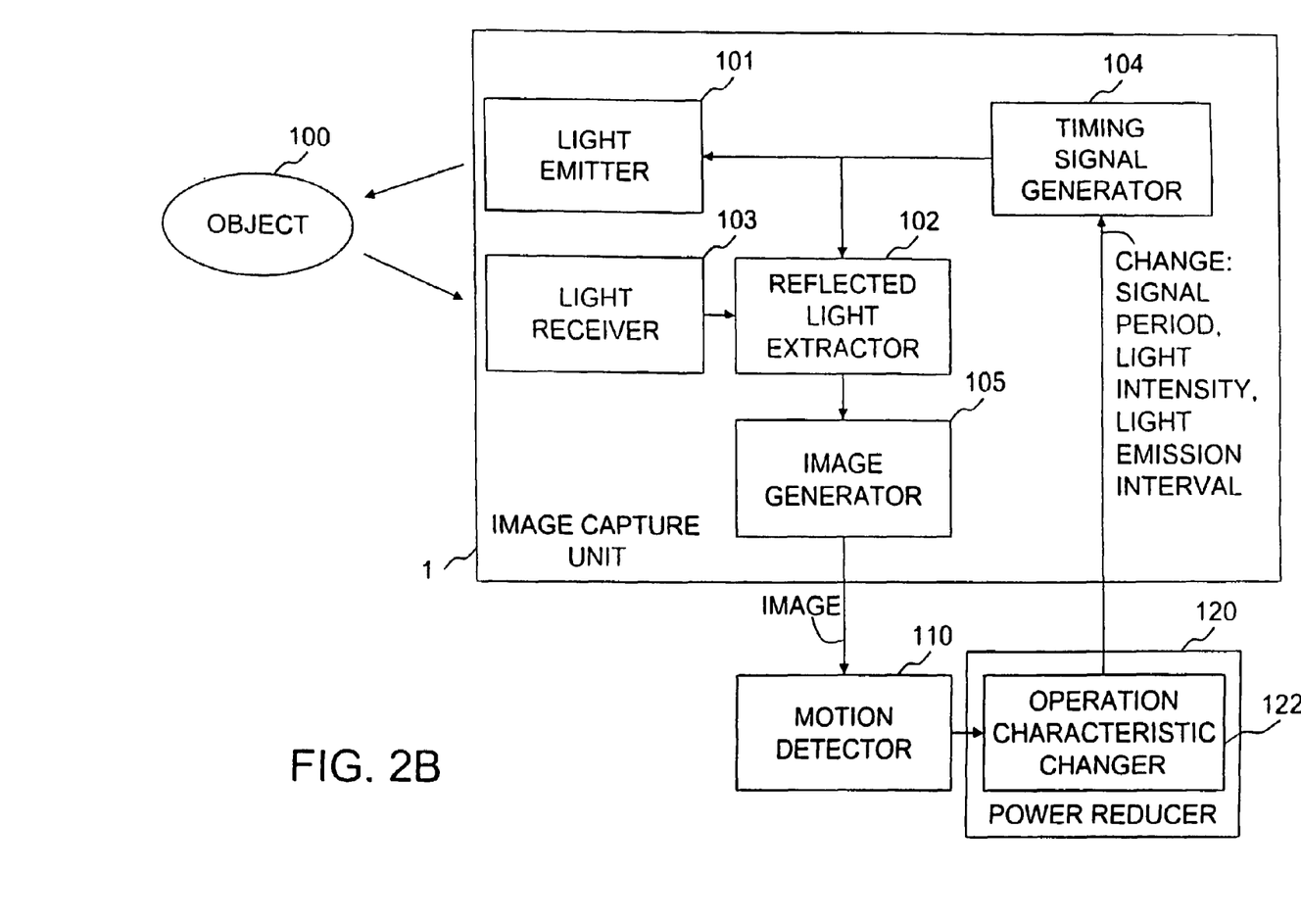
FIG. 2B is a block diagram thereof.

FIG. 2 is a schematic view of the image capture unit 1 described in, e.g., Japanese Patent Application No. 9-299648. The image capture unit 1 comprises a light emitter 101, light receiver 103, reflected light extracting section 102, and timing signal generator 104. The light emitter 101 emits light, the intensity of which changes temporally in accordance with a timing signal generated by the timing signal generator 104. This light illuminates an object located in front of the light emitter.

The light receiver 103 detects the amount of light emitted by the light emitter 101 and reflected by the object. The reflected light extracting section 102 extracts a spatial intensity distribution of the reflected light received by the light receiver 103. Since the spatial intensity distribution of the reflected light can be considered as an image, it will be referred to as a reflected light image or distant image hereinafter.

The light receiver 103 receives not only the light emitted by the light emitter 101 and reflected by the object, but also external light such as illumination light, sunlight, and the like. The reflected light extracting section 102 has a lens for focusing received light when the light emitter 101 is emitting light, and small circles that bound the lens correspond to LEDs for irradiating light such as infrared rays. Light beams emitted by these LEDs are reflected by the object, are focused by the lens, and are received by an area sensor placed behind the lens. An image captured in this way has a format shown in FIGS. 3 and 4.

FIG. 2B shows a block diagram of an information input apparatus having a distant image capture unit 1 configured to capture a distant image of an object 100, a motion detector 110 configured to detect motion of the object 100 in the distant image captured by said distant image capture unit 1, and a power reducer 120 configured to reduce power consumption of the apparatus. The power reducer 120 includes a changer 122 configured to change an operation characteristic of said distant image capture unit 1 based on whether said motion detector 110 detects the motion of the object 100 in the captured distant image, so as to reduce the power consumption of the apparatus.

The distant image capture unit 1 includes a timing signal generator 104 configured to generate a timing signal comprised of a pulse signal or a modulation signal, a light emitter 101 configured to emit light, an intensity of which changes on the basis of a signal from said timing signal generator, a reflected light extractor 102 configured to extract light emitted by said light emitter and reflected by the object 100 in synchronism with the signal from said timing signal generator 104, and a distant image generator 105 configured to generate a distant image of the object 100 on the basis of the reflected light extracted by said reflected light extractor 102.

The changer 122 can include a period changer configured to change a period of the signal generated by said timing signal generator when said motion detector detects the motion of the object in the generated distant image, an emission intensity changer configured to change an emission intensity of said light emitter when said motion detector detects the motion of the object in the generated distant image; and/or an emission interval changer configured to change an emission interval of said light emitter when said motion detector detects the motion of the object in the generated distant image.

Figure 3:
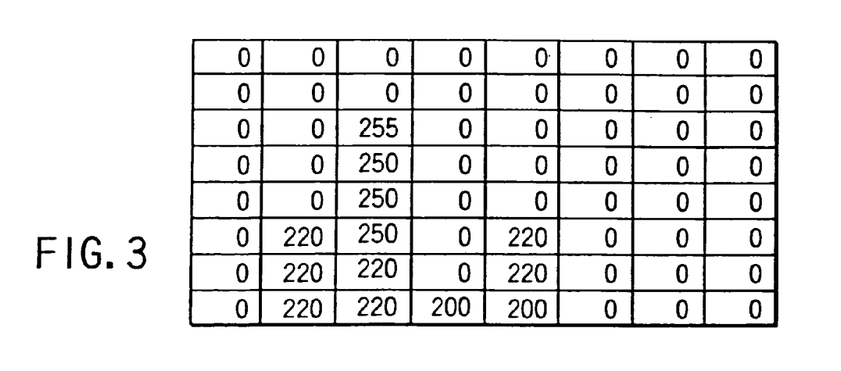
FIG. 3 is a table showing image data captured by the present invention.

FIG. 3 shows some (8×8 bits of 256×256 bits) of the captured image data. In this example, cell values in a matrix indicate the intensities of the captured reflected light by 256 bits. A cell with a value "255" indicates a state closest to the image capture unit 1, and a cell with a value "0" indicates a state farthest from the image capture unit 1, i.e., a state wherein reflected light does not reach the image capture unit 1.

Figure 4:
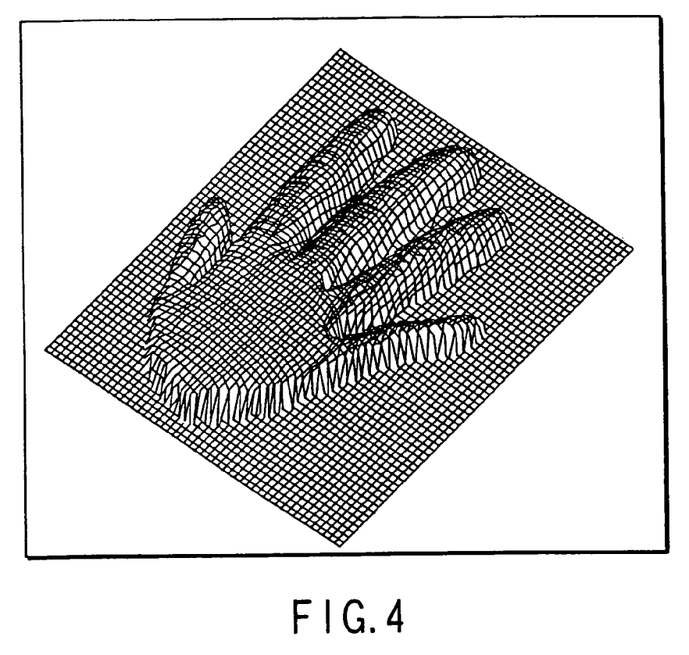
FIG. 4 shows image data captured by the present invention.

FIG. 4 three-dimensionally depicts the entire captured image data. In this example, data is obtained by capturing the image of the hand of the user.

The image processor 2 receives a distant image captured by the image capture unit 1 in the format shown in FIG. 3, and executes various kinds of image processing such as edge extraction, barycenter extraction, area calculation, and the like.

Figure 5:
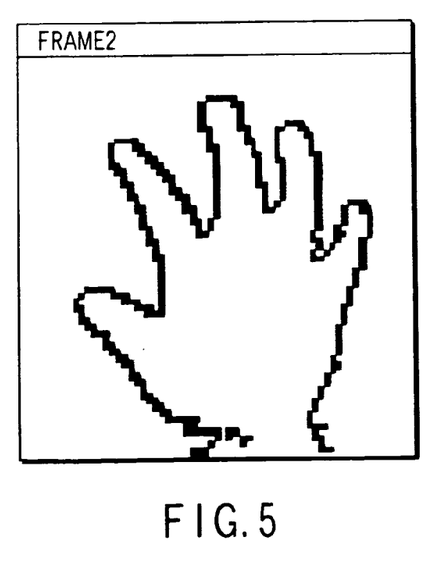
FIG. 5 shows edge information of image data captured by the present invention.

If $P_{ij}$ represents the pixel value of a matrix (i, j) shown in FIG. 3, and $R_{ij}$ represents the pixel of edge information to be generated, edge information shown in FIG. 5 is given by:

$R_{ij}=255$ (If $(P_{ij}-P_{i-1j})>\alpha$ & $(P_{ij}-P_{ij-1})>\alpha$ & $(P_{ij}-P_{i+1j})>\alpha$ & $(P_{ij}-P_{ij+1})>\alpha$)

$R_{ij}=0$ (Others)

The image processor 2 calculates the barycenter of the object on the basis of the edge information obtained, as shown in FIG. 3 or 5. Whether or not the object is moving is calculated by checking if the barycenter in the current frame is the same as that in the previous frame.

The image capture unit 1 can change the image capture timing and the like. In the processing flow shown in FIG. 6, such initialization processes are done in step 501.

Figure 6:
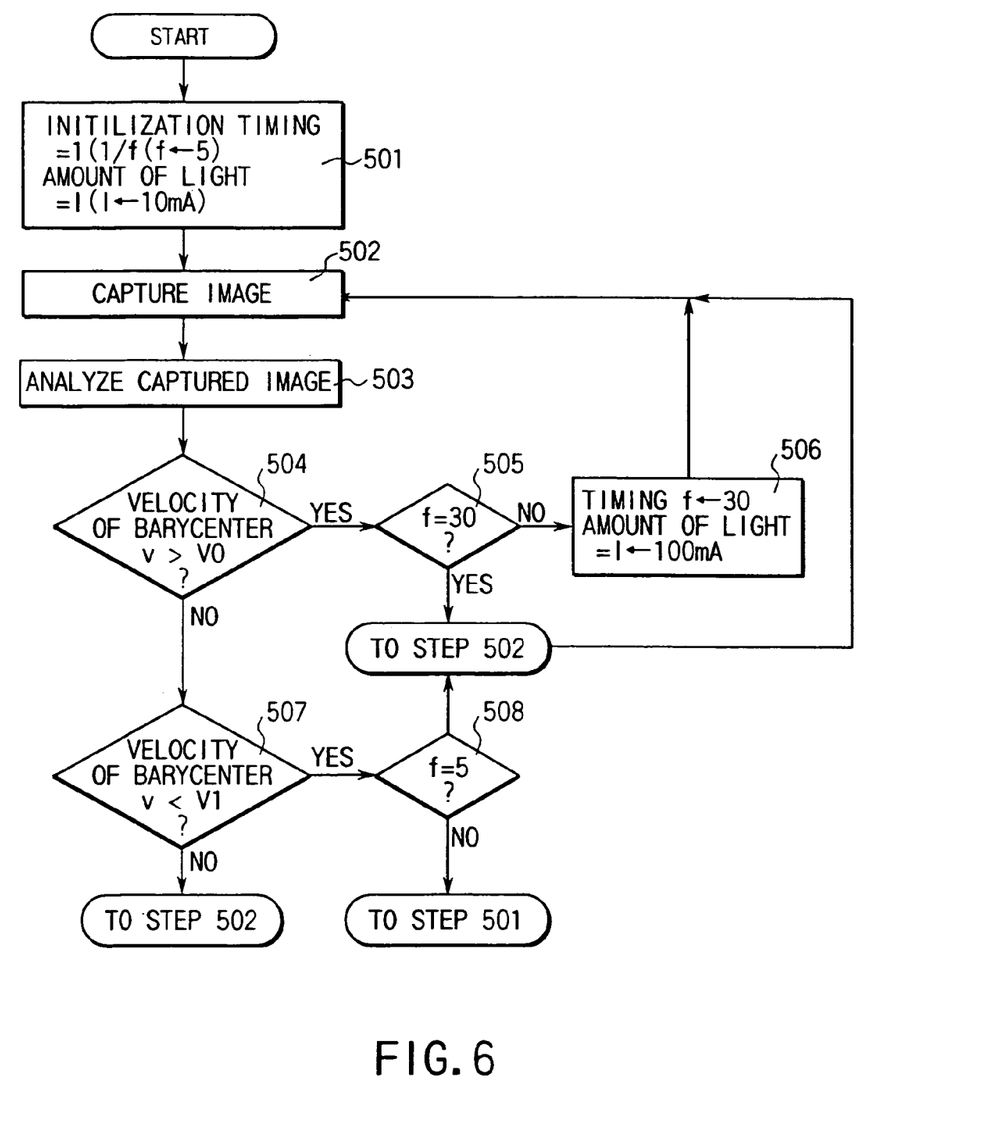
FIG. 6 is a flow chart showing the flow of the processing according to the present invention.

In the example shown in FIG. 6, an image capture timing 1/f Hz (f is the number of frames of an image to be captured per second) is set at f=5. Since the number of frames of a normal video movie is 30 per sec, the image capture unit 1 operates at a speed ⅙ the normal speed. As the number of frames of an image to be captured is smaller, the consumption power required for light emission, and transfer and processing of the captured image can be reduced accordingly.

In a normal state (not in use), the number of frames to be captured is decreased to reduce the consumption power.

On the other hand, an amount I of light indicates the current value when the light emitter 101 emits light. In this example, a current value as low as 10 mA is set. That is, when there is no moving object, the amount of light is reduced to save power.

With such setup, the light emitter 101 starts and stops light emission to capture a reflected image shown in FIG. 4 (step 502). The captured image is analyzed to calculate the velocity of barycenter (step 503).

If the calculated velocity of barycenter is equal to or larger than a predetermined value, it is determined that the user has approached the information input apparatus of the present invention with the intention of using it to input. In this example, if the velocity≧V0, it is determined that the user wants to use the apparatus (step 504).

When the user actually uses the apparatus, it is hard to capture images following user's gestures under the condition including five frames per second and the amount of light=10 mA. For this reason, the capture timing is set at 30 frame per second and the amount of light is set at 100 mA (step 506) to capture an image (to step 502).

If the apparatus is already in use and the timing is set at 30 frames per second (step 505), the control skips step 506 to continue image capture.

If the user quits use of the information input apparatus and leaves, no moving object is detected. That is, it is checked if the velocity V is lower than a predetermined velocity V1 (step 507). Even when the user is using the information input apparatus, he or she may not move so quickly. For this reason, the velocity V1 used in checking in step 507 is lower than the velocity V0 used for checking if the user intends to begin using the information input apparatus. More specifically, when such value is set, the user can stably use the apparatus at a relatively low velocity compared to a velocity when he or she approaches it to use it.

If it is determined that the user quits the use (YES in step 507), the capture timing and the amount of light are respectively re-set at 5 frames per sec and 10 mA (step 509). If the end processing has already been done and the capture timing has been set at five frames per second (step 508), the control skips step 509.

This state is the same as the initial state set in step 501. That is, a power saving mode is set until the user begins to use the apparatus.

According to the arrangement of the first embodiment, while the user does not use the information input apparatus, the consumption power is reduced. When the user approaches the information input apparatus to use it, the capture timing and the like are automatically set to follow a user's gesture. Therefore, the consumption power can be easily reduced without imposing any load on the user.

(Modification of First Embodiment)

In the first embodiment, the capture timing and amount of light are changed depending on whether or not the user is using the apparatus. However, the present invention is not limited to this. For example, if the resolution is low, the time required for reading out or transferring an image can be shortened, and the consumption power can be reduced. Changes in image capture characteristics such as changes in resolution and the like which lead to a reduction of the consumption power are also available.

In the first embodiment, the image processor 2 is implemented by software to execute various kinds of image processing.

For example, if it is determined based on only the velocity of barycenter whether or not the user is using the apparatus, as described in the first embodiment, a section dedicated to extraction of the velocity of barycenter can be realized by a hardware logic such as a gate array. Using such hardware, the apparatus can be made more compact.

Whether or not the user is using the apparatus is determined based on the velocity in this embodiment. However, the present invention is not limited to such specific parameter. For example, whether or not the user approaches the apparatus may be determined based on distance.

In the embodiment of the present invention, if it is determined that the user is using the apparatus, both the capture timing and amount of light are changed. However, the capture timing and amount of light need not always be synchronously changed, and only one of them may be increased.

Second Embodiment

The first embodiment aims at reducing the consumption power by determining whether or not the user is using the apparatus, and changing the image capture characteristics according to the determination result. Since the first embodiment is premised on that the user approaches the information input apparatus to use it to, e.g., input, the presence/absence of use can be determined based on the velocity of barycenter, distance, and the like.

By contrast, the present invention may be used for another purpose, e.g., monitoring whether or not someone enters a room or where he or she is. In such case, if only the velocity is checked, no action can be taken unless an object falls within the capture range of the information input apparatus.

Upon making inputs to home information equipment such as a PC, some members in the family may want to make inputs from a position separated more than a given distance from the home information equipment.

In such case, the apparatus may fail to image a target object if the control merely waits for the target object to fall within the capture range of the information input apparatus.

Figure 7:
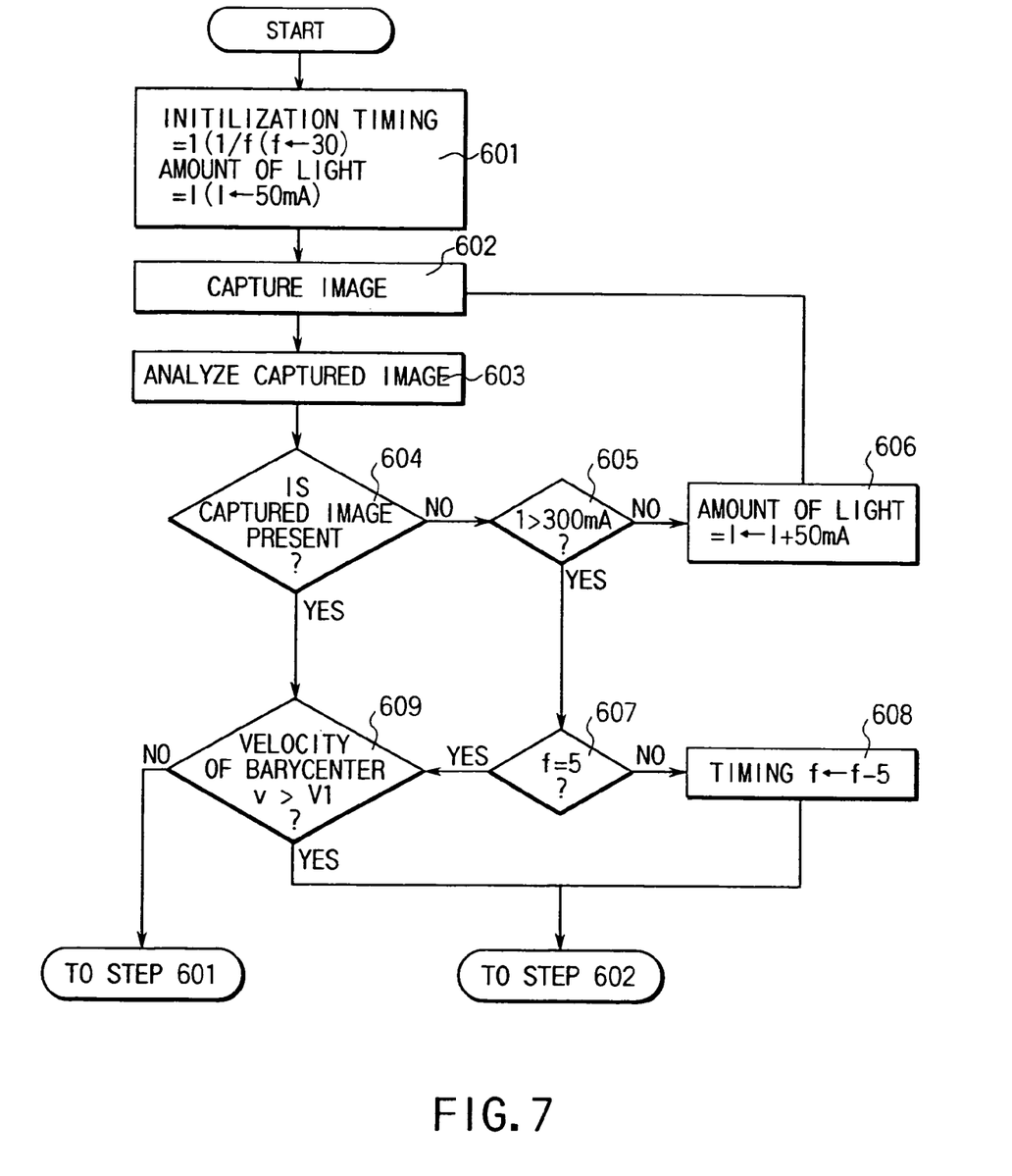
FIG. 7 is a flow chart showing the flow of the processing according to the present invention.

The second embodiment solves this problem. FIG. 7 is a flow chart of the processing of the second embodiment.

In this embodiment, assume that the capture timing and amount of light are respectively initialized to 30 frames per sec and 50 mA (step 601). An image is captured, and it is checked if the captured image includes a target object (step 604). If an object is not imaged, it is determined that the object is located at a position far from the information input apparatus, and the amount of light is increased to increase the imaging distance (step 606).

An image is captured with the increased amount of light (e.g., 100 mA in this example) (step 602). Similarly, the amount of light is increased until an image can be captured. If the amount of light has reached a predetermined value (300 mA in the example in FIG. 7) (step 605), the amount of light is not increased any more (step 607).

If an image cannot be captured after the amount of light has reached 300 mA, the capture timing is delayed (step 608). That is, to delay the capture timing is to prolong the light-receiving time of the light receiver per frame. If the light-receiving time is prolonged, even weak light can be received for a long period of time, and the received charges can be increased. Hence, light reflected by a farther object can be received.

If the capture timing has reached a given value (e.g., five frames or less per sec), it becomes difficult for the information input apparatus to capture a gesture. Hence, the capture timing is not delayed any more (step 607).

If it is determined that the user quits use of the input apparatus (NO in step 609), the flow returns to the initialization step (step 601) to immediately stop wasteful emission.

According to this embodiment, since the capture characteristics are automatically changed until an image can be captured, even when a plurality of users share a single information input apparatus, they can make information inputs without manually changing the setup distance and the like. Hence, direct operation according to the user's intention can be realized without imposing any load on the user.

(Modification of Second Embodiment)

In this embodiment, when an object image cannot be captured, the amount of light is increased and the emission timing is delayed until it can be captured. However, both the amount of light and timing need not always be changed.

For example, only the amount of light or emission timing may be increased or delayed.

In this embodiment, the changed amount of light and timing are maintained until the user quits the use. However, the present invention is not limited to this. For example, an image may be captured with amounts of light decreased at given periods, and it is checked if an object image can be obtained. If it is determined that the image can be obtained at a given decreased amount of light, the decreased amount of light may be set again to capture an image.

The present invention described above can be implemented by software processing using a versatile processor without using dedicated hardware. For example, the processing shown in FIG. 6 or 7 can be implemented using a computer program, which is loaded into and executed by a computer via a recording medium such as a floppy disk, CD-ROM, or the like, thus achieving the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An information input apparatus comprising:
    a distant image capture unit configured to capture previous and current three-dimensional distant images, each image having three coordinates of an object;
    a motion detector configured to detect a motion of the object by comparing an image processing result of the current three-dimensional distant image with an image processing result of the previous three-dimensional distant image; and
    a changer configured to change an image capture timing of said distant image capture unit based on whether said motion detector detects the motion of the object.

2. The apparatus according to claim 1, wherein said distant image capture unit includes:
    a timing signal generator configured to generate a timing signal comprised of a pulse signal or a modulation signal;
    a light emitter configured to emit light, an intensity of which changes on the basis of a signal from said timing signal generator;
    a reflected light extractor configured to extract light emitted by said light emitter and reflected by the object in synchronism with the signal from said timing signal generator; and
    a distant image generator configured to generate each of the current and previous three-dimensional distant images of the object on the basis of the reflected light extracted by said reflected light extractor.

3. The apparatus according to claim 2, wherein said changer includes:
    a period changer configured to change a period of the signal generated by said timing signal generator when said motion detector detects the motion of the object.

4. The apparatus according to claim 2, wherein said changer includes:
    an emission intensity changer configured to change an emission intensity of said light emitter when said motion detector detects the motion of the object.

5. The apparatus according to claim 2, wherein said changer includes:
    an emission interval changer configured to change an emission interval of said light emitter when said motion detector detects the motion of the object.

6. The apparatus according to claim 2, wherein said changer includes:
    a period changer configured to change a period of the signal generated by said timing signal generator until the current three-dimensional distant image generated by said distant image generator is obtained with a predetermined volume.

7. The apparatus according to claim 2, wherein said changer includes:
    an emission intensity changer configured to change an emission intensity of said light emitter until the current three-dimensional distant image generated by said distant image generator is obtained with a predetermined volume.

8. The apparatus according to claim 1, wherein said image processing result of the three-dimensional distant image includes a barycenter of the three-dimensional distant image.

9. The apparatus according to claim 8, wherein said motion detector is configured to detect a motion of the object by calculating a velocity of the barycenter of the three-dimensional distant image.

10. An information input apparatus comprising:
a distant image capture unit configured to capture previous and current three-dimensional distant images, each image having three coordinates of an object;
a motion detector configured to detect a motion of the object by comparing an image processing result of the current three-dimensional distant image with an image processing result of the previous three-dimensional distant image; and
a changer configured to change a resolution of said distant image capture unit based on whether said motion detector detects the motion of the object.

11. An information input method comprising:
capturing previous and current three-dimensional distant images, each image having three coordinates of an object;
detecting a motion of the object by comparing an image processing result of the current three-dimensional distant image with an image processing result of the previous three-dimensional distant image; and
changing an image capture timing of said capturing step based on whether the motion of the object is detected.

12. The method according to claim 11, wherein said capturing step comprises:
emitting light, an intensity of which changes on the basis of a generated timing signal;
extracting reflected light of the emitted light reflected by an object, in synchronism with the timing signal; and
generating each of the current and previous three-dimensional distant images of the object on the basis of the extracted reflected light.

13. The method according to claim 11, wherein said image processing result of the three-dimensional distant image includes a barycenter of the three-dimensional distant image.

14. The method according to claim 13, wherein said detecting step comprises:
calculating a velocity of the barycenter of the three-dimensional distant image.

15. An article of manufacture comprising a computer usable medium having computer readable program code embodied therein configured to cause an operation characteristic of capturing a distant image to be changed, the computer readable program code in said article of manufacture including:
computer readable program code configured to cause a computer to capture previous and current three-dimensional distant images having three coordinates of an object;
computer readable program code configured to cause a computer to detect a motion of the object by comparing an image processing result of the current three-dimensional distant image with an image processing result of the previous three-dimensional distant image; and
computer readable program code configured to cause a computer to change an image capture timing of said computer capturing a distant image of the object based on whether said computer detects the motion of the object.

16. The article of manufacture according to claim 15, wherein said computer readable program code configured to cause a computer to capture a distant image of an object includes:
computer readable program code configured to cause a computer to emit light, an intensity of which changes on the basis of a generated timing signal;
computer readable program code configured to cause a computer to extract reflected light of the emitted light reflected by an object, in synchronism with the timing signal; and
computer readable program code configured to cause a computer to generate each of the current and previous three-dimensional distant images of the object on the basis of the extracted reflected light.

17. The article of manufacture according to claim 15, wherein said image processing result of the three-dimensional distant image includes a barycenter of the three-dimensional distant image.

18. The article of manufacture according to claim 17, wherein said computer readable program code configured to cause a computer to detect a motion of the object includes:
calculating a velocity of the barycenter of the three-dimensional distant image.

* * * * *